(12) United States Patent
Lif

(10) Patent No.: US 7,055,103 B2
(45) Date of Patent: May 30, 2006

(54) METHOD OF MATCHMAKING SERVICE

(76) Inventor: Itzhak Lif, 53 HaNassi Street, Givat Shmuel (IL)

( * ) Notice: Subject to any disclaimer, the term of this patent is extended or adjusted under 35 U.S.C. 154(b) by 536 days.

(21) Appl. No.: 09/940,237

(22) Filed: Aug. 28, 2001

(65) Prior Publication Data

US 2003/0043194 A1    Mar. 6, 2003

(51) Int. Cl.
*G06F 3/00*    (2006.01)
*G06F 9/00*    (2006.01)
*G06F 17/00*    (2006.01)

(52) U.S. Cl. .................. 715/764; 382/118; 707/102; 707/3; 715/751; 705/5

(58) Field of Classification Search ............. 345/751, 345/764, 780; 382/115, 118; 705/5; 707/3, 707/102
See application file for complete search history.

(56) References Cited

U.S. PATENT DOCUMENTS 5,764,790 A  *  6/1998  Brunelli et al. ............ 382/118
5,963,951 A  *  10/1999 Collins ....................... 707/102
6,052,122 A      4/2000  Sutcliffe et al. ............. 345/751
6,061,681 A      5/2000  Collins ......................... 707/5
6,249,282 B1    6/2001  Sutcliffe et al. ............. 345/751

OTHER PUBLICATIONS

Match.com. http://www.match.com, pp. 1-18, Mar. 30, 2001 webpage archives.*
Asimba.com. http://web.archive.org/web/20000511183935/www.asimba.com/asm/Home. pp. 1-2, May 11, 2000 webpage archives.*

* cited by examiner

*Primary Examiner*—Kristine Kincaid
*Assistant Examiner*—Boris Pesin
(74) *Attorney, Agent, or Firm*—Mark M. Friedman

(57) ABSTRACT

An improved method for matchmaking of a searcher and prospective candidates, including providing an image of each candidate, analyzing the image to define physical characteristics of each of the candidates, and selecting at least one potential match between the searcher and the candidates based on the characteristics.

15 Claims, 3 Drawing Sheets

METHOD OF MATCHMAKING SERVICE

FIELD AND BACKGROUND OF THE INVENTION

The present invention relates to a method for matching individuals based on the physical appearance of at least one of the individuals In many known matchmaking systems and methods, actual visual information is not used, and is only described in words: "blue eyes", "auburn hair", less often "oval face", "cute dimple", by way of example. The criteria for gathering and providing such textual information on the visual aspects of personal appearance are dictated by a limited space allotted by computer systems, the system designers and managers.

In many popular Internet matchmaking systems in use today, personal data of an individual who is a prospective match is classified into the categories of age, height, weight, skin color, ethnic background, level of physical activity or exercise, eye color, hair color, specific body part measurements, eye-glass wear status, smoking/non-smoking status, and a personal entry wherein the object individual can enter a short personal message or subjective description. Most of the system database is actually taken up by categories that have nothing to do with personal appearance, like the level of education, salary level, management level, personal interests, hobbies, parental status, range of dating travel, and geographical location. It is possible that there exists a system similar to an on-premise use dating center, which features viewing a short video recorded of a database member being interviewed in a relaxed setting and free to relay any message to a viewer. In such a system, physical characteristics of a database member are not clearly discerned due to the video made to display the person's frame, not his facial features and due to the quality of the video, which is usually an afterthought to the printed information. In the case of an Internet service, the image quality is also subject to the viewer's computer quality. Moreover, many prospective candidates are not interested in having their pictures posted on the Internet. As a result of using these systems, the date seekers either spend their date search ineffectively, being disappointed, or forced by circumstances to settle for a match that does not agree with their expectations for the physical appearance of the found candidates. Since the set of these candidates already agrees with the user's requirements, such a system may provides a plethora of so-called matching candidates who, in reality, are very far from the perceived true match. Even a matchmaking service providing a picture of each candidate does not categorize the visual information according to visual criteria, particularly to visual criteria that are difficult to characterize and/or quantify. Thus, such methods do not provide the user with selected lists of candidates based on various pre-selected physical criteria preferences, such that what is often most important to the user—personal appearance and, especially, facial features—is left largely to chance.

There is therefore a recognized need for, and it would be highly advantageous to have, a method for matchmaking that provides its users results based on their physical and facial visual requirements and allows for a significantly more accurate personal matching rate than methods known heretofore. It would be of further advantage if such a method would be enjoyable, quick and simple to use.

SUMMARY OF THE INVENTION

The present invention is a method for image-based matchmaking of a searcher and prospective candidates, the method including: (a) providing an image of each of the candidates; (b) analyzing the image of each the candidates to define physical characteristics; (c) storing the physical characteristics, and (d) selecting at least one potential match between the searcher and the candidates based on the characteristics.

According to further features in the described preferred embodiments, the inventive method further includes: (e) displaying the image of each potential match.

According to further features in the described preferred embodiments, the image is a compiled image.

According to further features in the described preferred embodiments, the method further includes: (f) selecting a matching candidate for the searcher based on the displaying of the image.

According to further features in the described preferred embodiments, the selecting is performed using at least one pre-defined selection criterion.

According to further features in the described preferred embodiments, the selecting is performed by a computer.

According to further features in the described preferred embodiments, the at least one pre-defined selection criterion includes a criterion of like physical characteristics between the searcher and the prospective candidates.

According to further features in the described preferred embodiments, the at least one pre-defined selection criterion includes a selection criterion based on correlative data on matching preferences.

According to further features in the described preferred embodiments, the at least one pre-defined selection criterion includes at least one selection preference obtained from the searcher.

According to further features in the described preferred embodiments, the image is constructed from a set of physical appearance information of one of the candidates.

According to further features in the described preferred embodiments, each set of physical appearance information is obtained from a questionnaire pertaining to one of the candidates.

According to further features in the described preferred embodiments, the questionnaire provides physical profile building information.

According to further features in the described preferred embodiments, the method further includes: (e) building and displaying a physical profile for each potential match.

According to further features in the described preferred embodiments, the analyzing of the image includes quantification of the physical characteristics.

According to further features in the described preferred embodiments, the analyzing of the physical characteristics is carried out according to a degree of likeness.

According to further features in the described preferred embodiments, the providing of an image of each of the candidates is accomplished by filling out a form.

According to further features in the described preferred embodiments, the form is a questionnaire.

According to further features in the described preferred embodiments, the form is filled out by the subscriber to a system based on the matchmaking method.

According to further features in the described preferred embodiments, step (a) is accomplished by analyzing at least one picture using a computer.

According to further features in the described preferred embodiments, the providing of an image of each of the candidates includes acquiring visual information selected from the group consisting of two dimensional and three dimensional information.

According to further features in the described preferred embodiments, the acquiring of information includes acquiring facial information.

According to further features in the described preferred embodiments, the acquiring of information includes acquiring body information.

According to further features in the described preferred embodiments, the method further includes: (e) providing statistical data on each of the candidates.

According to further features in the described preferred embodiments, the method further includes: (e) providing at least one referrer by the searcher.

According to further features in the described preferred embodiments, the at least one referrer is a potential searcher.

According to further features in the described preferred embodiments, the at least one referrer is a prospective candidate.

According to further features in the described preferred embodiments, the method further includes: (f) specifying a gender of the at least one referrer.

According to further features in the described preferred embodiments, the method further includes: (f) providing information on the searcher by the at least one referrer.

According to further features in the described preferred embodiments, the information is selected from the group of information consisting of verbal and written information.

According to further features in the described preferred embodiments, the information is a recommendation of the searcher.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
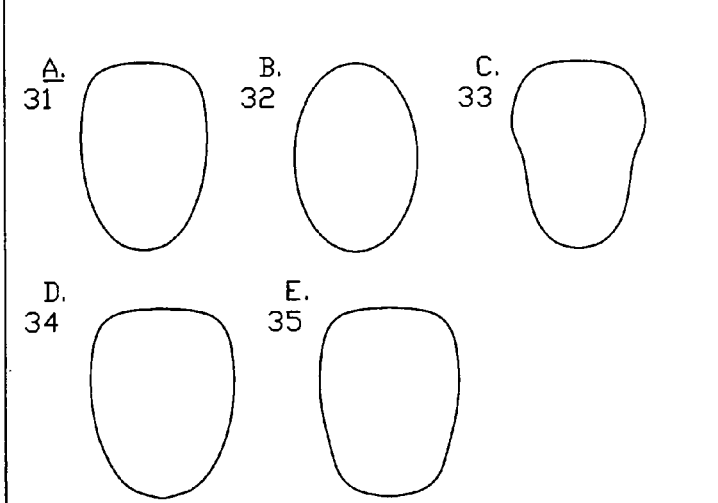
FIG. 1 is a diagram illustrating a graphic questionnaire for use in conjunction with the present invention.
Figure 1:
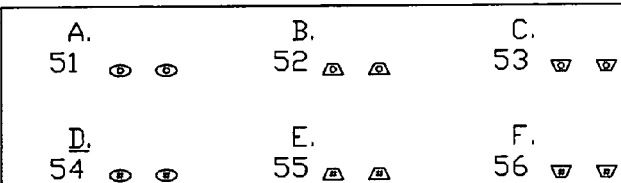
Figure 1:
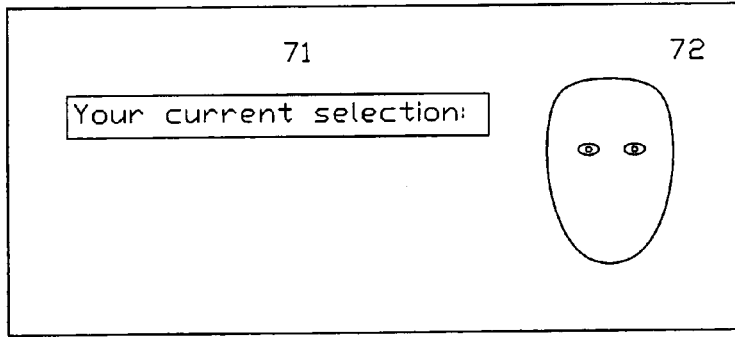

The principles and operation of the improved method for matchmaking according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

As used herein, the term "degree of likeness" refers to a relative measure of resemblance between two objects.

The term "graphic user interface" refers to any computer graphics representing computer files, functions and commands.

In the method of the invention, there are various ways of obtaining visual data on the physical characteristics of a candidate.

1. Subscriber Questionnaire.

The subscriber is asked to enter his or her visual data using a questionnaire. This procedure is similar to a facial appearance construction kit (e.g., Identikit) used by police to construct the appearance of a suspect. This approach puts the work (and honesty/objectiveness) on the subscriber side.

2. Automated Computerized Picture Analysis.

A subscriber submits his or her photo(s), including face and body view(s). Dedicated software then analyzes the photo(s) and extracts, using a vision algorithm, the specific facial and body attributes.

3. Manual Picture Analysis.

In this approach, the subscriber submits photo(s) as mentioned in the previous approach; matchmaking service personnel, who also fill in the questionnaire mentioned in the first approach, manually analyze the picture.

4. The Subscriber Goes in Person to the Service Provider.

The subscriber comes to the service provider offices (or a location specified by the service provider), has his or her picture taken and proceeds with one of the above-mentioned options 2 and 3. Alternatively, the subscriber is viewed in person and proceeds with the above-mentioned option 1 (when proceeding with option 1, the service provider employee fills out the questionnaire for the subscriber, see option 3 above).

The Questionnaire

In the first option, the subscriber registers with the matchmaking system and fills out a questionnaire, part of it including detailed visual face and body descriptions.

Filling in the face part of the questionnaire, the subscriber describes his or her face by choosing pre-defined facial parts, like eyebrows, eyes structure, location and color, nose structure and location, mouth structure and location, overall face build, skin complexion, mustache and beard (for men), hair texture, length and color, etc.

As mentioned, this method is similar to the Identikit appearance building procedure. The subscriber might have the choice of defining his or her desired spouse face (or part of it) or have no preferences about this at all.

When filling in the body part of the questionnaire, the subscriber describes his or her body by choosing pre-defined body parts, like shoulders, breast (for women), waist, bottom, arms and legs, overall build, etc. The subscriber might have the choice of defining his or her desired spouse body (or part of it) or have no preferences at all.

The Suggested Preferences

This is actually a mathematical function, where the input is a subscriber profile and the output is another subscriber profile (or part of it). In this context, the method of the invention addresses visual data but it is worthy to note that the function can be extended to other aspects of the subscriber's information. For example, the function might take into account the geographical location of the subscriber, or the educational level thereof. Similarly, this function might recommend attributes that are not included in the detailed visual information, for example, and recommend personality traits etc. (e.g., recommend a dominant person for a passive person and vice versa).

Also, this function might suggest priority levels for each trait recommended. For example, it might recommend high priority for similar eye color and low priority for similar eyebrows appearance.

This function might be any combination of the following:

Similar Attributes

The face category, for example, contains choices of similar eyes (e.g., color, shape, location), similar nose (e.g., shape and location), similar mouth (e.g., shape and location) etc. In the body category, similar body attributes can include similar height (where the male is somewhat taller than the female) and similar body build (e.g., broad build to broad build, slim build to slim build, etc.)

Statistical Data

Based on empirical data obtained statistically from previous subscribers, this function recommends attributes that previous subscribers with similar attributes preferred. For example: if the majority of the slim males with brown-green eyes and a mustache preferred slightly overweight females then the recommendation for a slim male with brown-green eyes and a mustache might be a slightly overweight female.

Referral System

The subscriber is also asked to bring N (a number) of specific referees. N is a non-zero positive integer set by the service provider or by the matchmaking system. The referees should meet specific criteria set, per subscriber, by the matchmaking system. These referees review part (or all) of the subscriber profile and/or write a recommendation about the subscriber or just recommend. The subscriber is asked to bring referees that should be:

A. Single and not Subscribed to the System

The referees are also potential customers. When they are aware of the service they might subscribe to the system themselves. This might reduce (or even eliminate) the need for media advertisement. Even if a small fraction of the referees subscribes to the system, the database building rate could (in certain situations, i.e., depending on the value of N and the percentage of referees who actually subscribe to the service) be considerably faster than "traditional" systems, which is potentially beneficial to both the subscribers and the service providers.

B. Be of Specific Gender

When a user subscribes to the system, the number of males and number of females is counted resulting in one of the following three situations:

1. Significantly more Males than Females

In this case, the new subscriber is asked to bring female referees, thereby making an effort to correct the imbalance.

2. Equal (or "Close" to Equal) Number of Males and Females

In this case, the new subscriber is asked to bring an equal number of female and male referees (If N is odd, the new subscriber is considered, for this calculation only, as a "referees"), such that an effort is made to preserve this balanced situation.

3. Significantly More Females than Males

In this case the new subscriber is asked to bring male referees, thereby an effort is made to correct the imbalance.

Referring now to the drawings, FIG. 1 illustrates a graphic questionnaire according to the present invention. In one embodiment in the method of the invention, a user of the matchmaking method visits a matchmaking facility that employs the matchmaking method of the invention. At the facility, the user is presented with a graphic questionnaire, an exemplary form of which is pictured in FIG. 1. Form field 10 consists of instruction fields, or prompts, like prompts 20 and 40, multiple choice fields 30 and 50 and message fields, like box 70. The user is prompted to start selecting user preferences for a sought mate by instruction 20, asking to choose a face type. Possible face types are presented in multiple choice field 30 containing graphic illustrations of facial types 31 through 35, labeled A through E, correspondingly.

The category, on form field 10, eye type, includes instruction field 40 and multiple choice field 50, which contains graphic illustrations of eye types 51 through 56, labeled A through F, correspondingly. The eye type graphics can be sections of high-resolution film or digital photographs.

Similarly, a category of form field 10 relating to eye color can contain multiple choices represented by high-resolution, close-up photographs of real human eyes of numerous possible variations in color.

Upon conclusion of form field 10 by the user, a result form field 70 is compiled and displayed either at the end of every progressive update or after each selection.

The matchmaking facility staff member fills out a questionnaire describing the face of the new subscriber and then starts the search for prospective matches by using composite 72 as a standard for comparison with photographs or other stored visual data of each of the members that have subscribed and participated in the matchmaking based on the method of the invention.

Another embodiment of the method of the invention is computer-network based or interactive-television based. Participants in the matchmaking organization based on the method of the invention have their face and body photographed preferably onto high-resolution film or by a digital camera. The photographs are entered into the organization's image processing computer, which has been pre-loaded with image-processing and image-storing software. The image processing software also includes image analysis programs that are capable of dividing an image of a person or person's face into basic elements, like the eyes, the area of the nose, of the mouth, etc. The image analysis results are assigned their own unique identifiers and stored into the reference database on the central computer.

Thus, after a member by name of Julie Smith is photographed and entered into the central computer database, the unique file in the database bears her name, her personal data and all the files of each element, or combination of elements derived from the photographs. File name 1JS0323FYU can stand for female (1), a unique name initial-member number (JS0323), element for mouth area (F), graphic type (Y) and mouth appearance type (U).

The search for a mate begins with the searcher accessing the organization's computer via the Internet, or a dedicated access line, or a terminal at one of the matchmaking organization's branches. These, in turn, are connected to the central processing computer at the organization's headquarters. The user signs on to the computer, identifies himself with his own user number, and is allowed into the computer by means of graphic user interface software.

The user further specifies a start of a new search and is guided by message and dialog boxes to form field 10. The central computer gathers the user's preferences by prompting the user with instruction fields like 20 and 40, and the user choosing his choice of appearance elements from multiple choice fields like 30 and 50.

Figure 2:
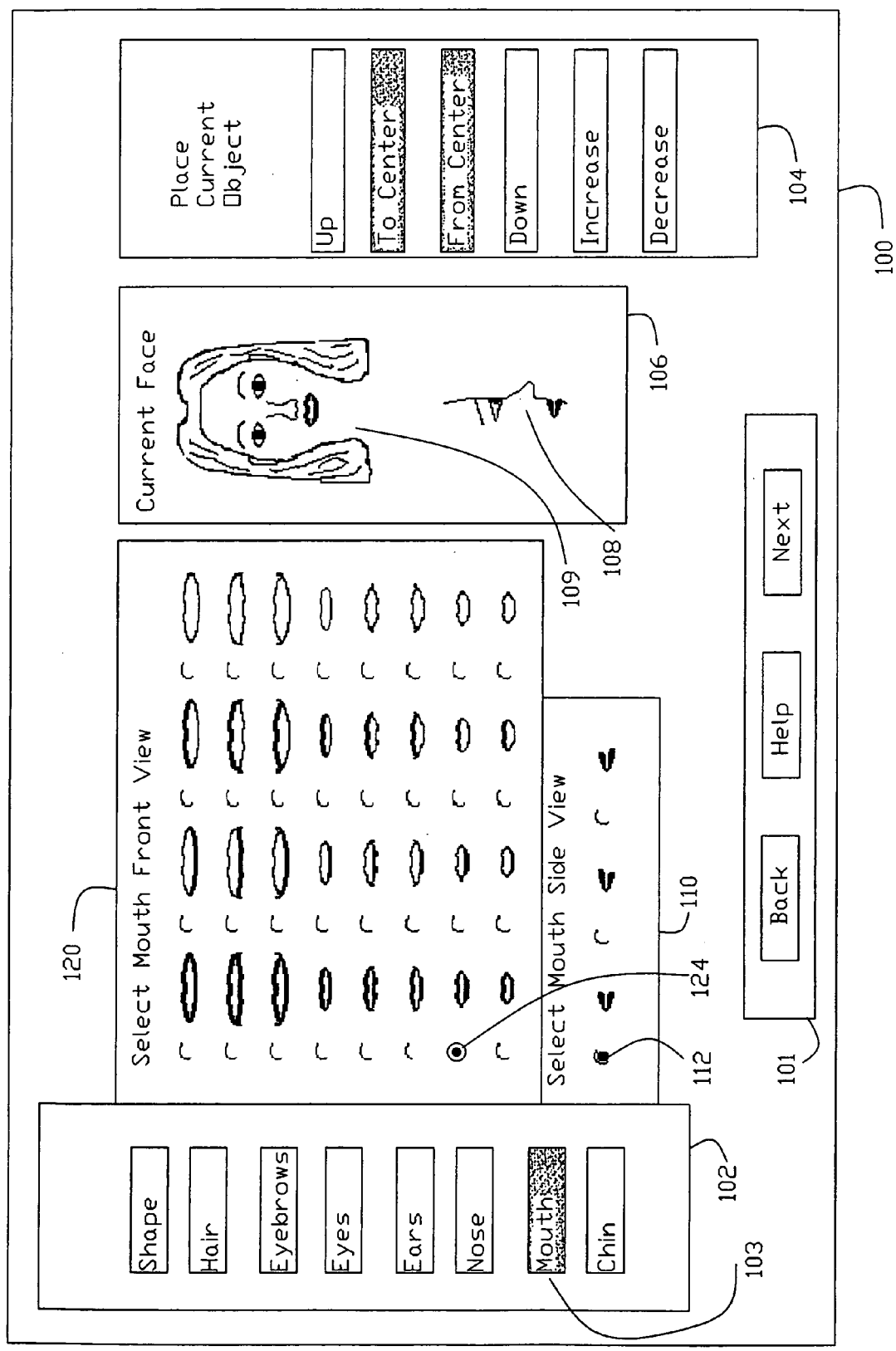
FIGS. 2 and 3 illustrate pages of a computer-based questionnaire in one of the embodiments in the method of the invention.

The graphic user interface can alternatively be a page, or form field 100 illustrated in FIG. 2. The form has a navigational field 101 for accessing previous or forthcoming pages or steps of the process. On the left of form field 100, a field 102 contains labeled HTML hover buttons with labels corresponding to preferred facial elements. A field 104 contains buttons for a desired relative position of the mouth of a candidate. Field 120 contains a set of different mouth outlines, with an outline chosen by activating a corresponding radio button 124. In a field 110 there are disposed variations of mouth side views, with a variation chosen by a radio button 112. In a facial appearance elements field 102 there are hover buttons corresponding to appearance categories. In order to proceed to form field 100 that gathers data on preferred mouth features, button 103 ("Mouth") on form 102 was clicked on a page previous to form field 100 page.

A field 106 in FIG. 2 displays results of selecting preferred appearance elements from fields 104, 110 and 120. Field 106 is labeled "Current Face" and contains a resultant side view 108 and frontal view 109 of preferred facial appearance.

Figure 3:
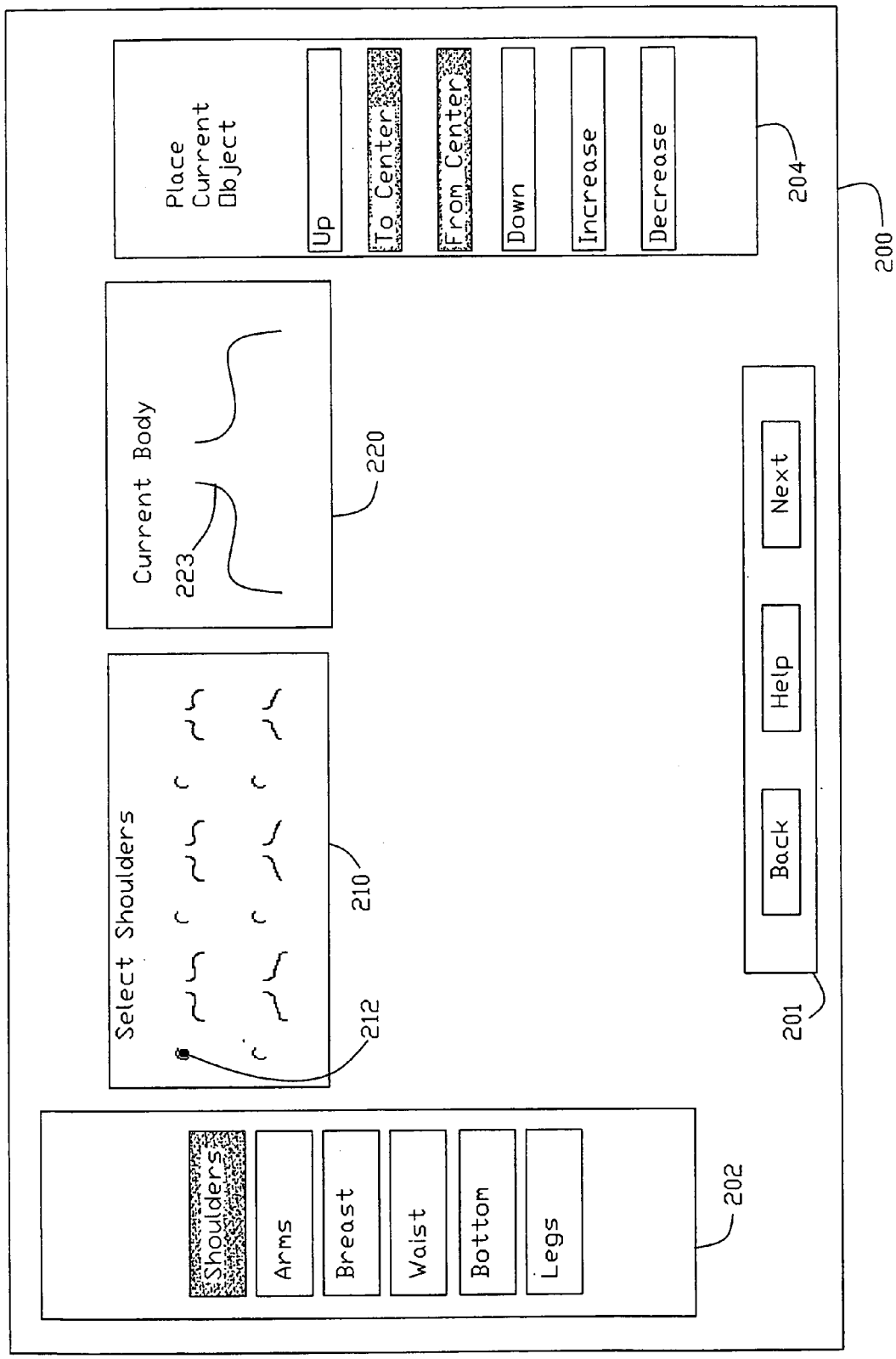

FIG. 3 illustrates a form field 200 that is used for gathering selected preferences pertaining to shoulders. On the left side of form field 200 there is form 202 containing buttons corresponding to body elements. The right side of form field contains buttons for a desired relative position of a preferred element. The bottom of form field 200 has a navigation field 201 with buttons for advancing to next page, returning to previous page and obtaining help. Field 210 contains a set of different shoulder outlines, with an outline chosen by activating a corresponding radio button 212.

A field 220 in FIG. 3 displays results of selecting preferred appearance elements from fields 204 and 210. Field 220 is labeled "Current Body" and contains a resultant view 223 preferred shoulder appearance.

With each confirmation of searcher choice, the central computer categorizes and identifies the preferred form of each appearance element and compiles the preferences into a code, for example, an alphanumeric string A23B1C22D0422E12F102G32H44I21J3K09, where A through K can be designators for different body elements and their types with their corresponding numerical classification.

At the end of the user input, the central computer launches an element matching procedure that can involve image matching and analysis algorithms. Using refined image optimization codes of the image elements and actual image elements themselves that the user specified, the central computer compares the user preferences to all personal image entries in its database and eventually finds one or more entries that agree with the user's personal taste.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computer implemented method executing on a computer system for image-based matchmaking of a searcher and prospective candidates, the method comprising:
   (a) providing an image of each of the candidates;
   (b) analyzing said image of each of the candidates to define physical characteristics;
   (c) storing said physical characteristics;
   (d) selecting at least one potential match between the searcher and said candidates based on said characteristics;
   (e) providing at least one referee by the searcher, and
   (f) specifying a gender of said at least one referee.

2. The method of claim 1, wherein said providing an image of each of the candidates is accomplished by filling out a form.

3. The method of claim 2, wherein said form is a questionnaire.

4. The method of claim 2, wherein said form is filled out by the subscriber to a system based on said matchmaking method.

5. The method of claim 1, wherein said analyzing said image includes quantification of said physical characteristics.

6. The method of claim 5, wherein said analyzing of said physical characteristics is carried out according to a degree of likeness.

7. A computer implemented method executing on a computer system for image-based matchmaking of a searcher and prospective candidates, the method comprising:
   (a) providing an image of each of the candidates;
   (b) analyzing said image of each of the candidates to define physical characteristics;
   (c) storing said physical characteristics;
   (d) selecting at least one potential match between the searcher and said candidates based on said characteristics;
   (e) providing at least one referee by the searcher, and
   (f) providing information on the searcher by said at least one referee.

8. The method of claim 7, wherein said information is selected from the group of information consisting of verbal and written information.

9. The method of claim 7, wherein said information is a recommendation of the searcher.

10. The method of claim 7, wherein said selecting is performed using at least one pre-defined selection criterion.

11. The method of claim 10, wherein said selecting is performed by a computer.

12. The method of claim 11, wherein said at least one pre-defined selection criterion includes a criterion of like physical characteristics between the searcher and the prospective candidates.

13. The method of claim 12, wherein said at least one pre-defined selection criterion includes a selection criterion based on correlative data on matching preferences.

14. The method of claim 12, wherein said at least one pre-defined selection criterion includes at least one selection preference obtained from the searcher.

15. The method of claim 10, wherein said image is constructed from a set of physical appearance information of one of the candidates.

* * * * *